US006878886B1

(12) United States Patent
Mange et al.

(10) Patent No.: US 6,878,886 B1
(45) Date of Patent: Apr. 12, 2005

(54) CONTROL DEVICE FOR MOTOR VEHICLE IN PARTICULAR FOR CONTROLLING AN ON-BOARD COMPUTER

(75) Inventors: Jean-Christophe Mange, St. Maurice (FR); Claudio Chiattelli, Le Blanc Mesnil (FR)

(73) Assignee: Valco Electronique, Creteil (FR)

( * ) Notice: Subject to any disclaimer, the term of this patent is extended or adjusted under 35 U.S.C. 154(b) by 0 days.

(21) Appl. No.: 10/479,573

(22) PCT Filed: Jun. 6, 2002

(86) PCT No.: PCT/FR02/01932

§ 371 (c)(1),
(2), (4) Date: May 17, 2004

(87) PCT Pub. No.: WO02/099825

PCT Pub. Date: Dec. 12, 2002

(30) Foreign Application Priority Data

Jun. 7, 2001 (FR) .............................. 01 07468

(51) Int. Cl.[7] .................... H01H 9/00; H01H 13/14; H01H 19/14; H01H 25/00
(52) U.S. Cl. ..................... 200/5 R; 200/4; 200/61.27; 200/61.54
(58) Field of Search ............. 200/61.27–61.38, 200/61.54–61.57, 1 R, 4, 5 R, 5 A, 6 R, 6 A, 11 R–11 TW, 14, 52 R, 335–337, 533–535, 573

(56) References Cited

U.S. PATENT DOCUMENTS

| | | | | |
|---|---|---|---|---|
| 3,715,545 A | * | 2/1973 | Long ........................ 200/533 |
| 4,387,279 A | * | 6/1983 | Brevick ................... 200/61.54 |
| 4,394,546 A | | 7/1983 | Harumatsu |
| 4,609,795 A | * | 9/1986 | Lavigne et al. ......... 200/533 X |
| 4,857,677 A | | 8/1989 | Tanaka et al. |
| 5,003,132 A | * | 3/1991 | Lagier ......................... 200/4 |
| 5,566,819 A | * | 10/1996 | Lustgarten et al. ..... 200/535 X |
| 5,701,660 A | * | 12/1997 | Javery et al. ................ 29/622 |

FOREIGN PATENT DOCUMENTS

| | | |
|---|---|---|
| EP | 0389366 | 9/1990 |
| EP | 1017077 | 7/2000 |

* cited by examiner

Primary Examiner—James R. Scott
(74) Attorney, Agent, or Firm—James R. Williams

(57) ABSTRACT

The device comprises a support (16) provided with a proximal end (16P) carrying first and second control buttons (22, 24) and a distal end (16D) carrying means forming an electrical contactor. The support (16) also carries at least a first control ring (1B) mounted to turn about a geometrical axis called longitudinal axis (X), and first and second control rods (40, 42) that are longitudinally displaceable through the first control ring (18), each having a proximal end connected to a corresponding control button (22, 24) and a distal end for actuating the electrical contactor means. The first and second control rods (40, 42) include mutual longitudinal guide means (44, 46, B). The invention is applicable to controlling windscreen wipers and a computer on board a vehicle.

10 Claims, 5 Drawing Sheets

CONTROL DEVICE FOR MOTOR VEHICLE IN PARTICULAR FOR CONTROLLING AN ON-BOARD COMPUTER

FIELD OF THE INVENTION

The present invention relates to a motor vehicle control device in particular for controlling an on-board computer.

DESCRIPTION OF RELATED ART

In the state of the art, a motor vehicle control device is already known of the type comprising:

- a support provided with a proximal end carrying a first control button and a distal end carrying means forming an electrical contactor; and
- the support further carrying at least a first control ring mounted to turn about a geometrical axis called longitudinal axis, and at least a first control rod that is longitudinally movable through the first control ring, having a proximal end connected to a first control button and a distal end for actuating the electrical contactor means.

The control ring and button form electrical switch means suitable for controlling a variety of electrical members. In conventional applications of the above-described control device, the rotary ring controls a motor or sequencing means for windscreen wipers of the vehicle, and the control button controls a horn.

SUMMARY OF THE INVENTION

The object of the invention is to increase the electrical switch means carried by a control device of the above-specified type, specifically for the purpose of enabling the device to be used for controlling an on-board computer having multiple menus, and to do so without spoiling the ergonomic characteristics of the control device.

To this end, the invention provides a motor vehicle control device of the above-specified type, characterized in that the support carries a second control rod that is longitudinally displaceable through the first control ring, having a proximal end connected to a second control button carried by the proximal end of the support, and a distal end for actuating electrical contactor means, the first and second control rods including mutual longitudinal guide means.

According to other features of the device:

- the longitudinal guide means comprise complementary mutual guide faces each provided with an offset forming a longitudinal guide strip;
- the complementary mutual guide faces are provided with projections defining mutual contact areas that are small;
- each of the first and second control rods presents a cross-section that is circular and interrupted by the complementary mutual guide faces;
- the electrical contactor means comprise flexible first and second flexible conductive tongues each of which is elastically deformable between a position in which it opens a corresponding electrical circuit and a position in which it closes the corresponding electrical circuit, with each of the blades being urged towards the closed-circuit position by a corresponding one of the control rods;
- the distal end of each of the first and second rods carries a stud for co-operating with the corresponding flexible conductive tongue;
- the distal end of the support is articulated on a baseplate;
- the first control ring is mounted to turn on the proximal end of the support and carries the first and second control buttons, the first and second control rods forming an assembly of generally cylindrical shape that is substantially coaxial about the longitudinal axis;
- the support carries a second control ring mounted to turn about the longitudinal axis, being interposed axially between the first control ring and the distal end of the support; and
- the two control buttons are designed to control a computer on board the vehicle.

BRIEF DESCRIPTION OF THE DRAWINGS

The invention will be better understood on reading the following description given purely by way of example and made with reference to the accompanying drawings, in which.

DETAILED DESCRIPTION OF THE INVENTION

FIGS. 1 to 4 show a control device 10 for a motor vehicle constituting a first embodiment of the invention. The device 10 is intended for controlling firstly a motor and/or sequencing means for windscreen wipers, and secondly a computer on board the vehicle.

The control device 10 comprises a baseplate 12 having a lever 14 articulated thereon. The baseplate 12 is fitted in the cabin of the vehicle, preferably close to the steering wheel so as to give the driver of the vehicle easy access to the lever 14.

Figure 1:
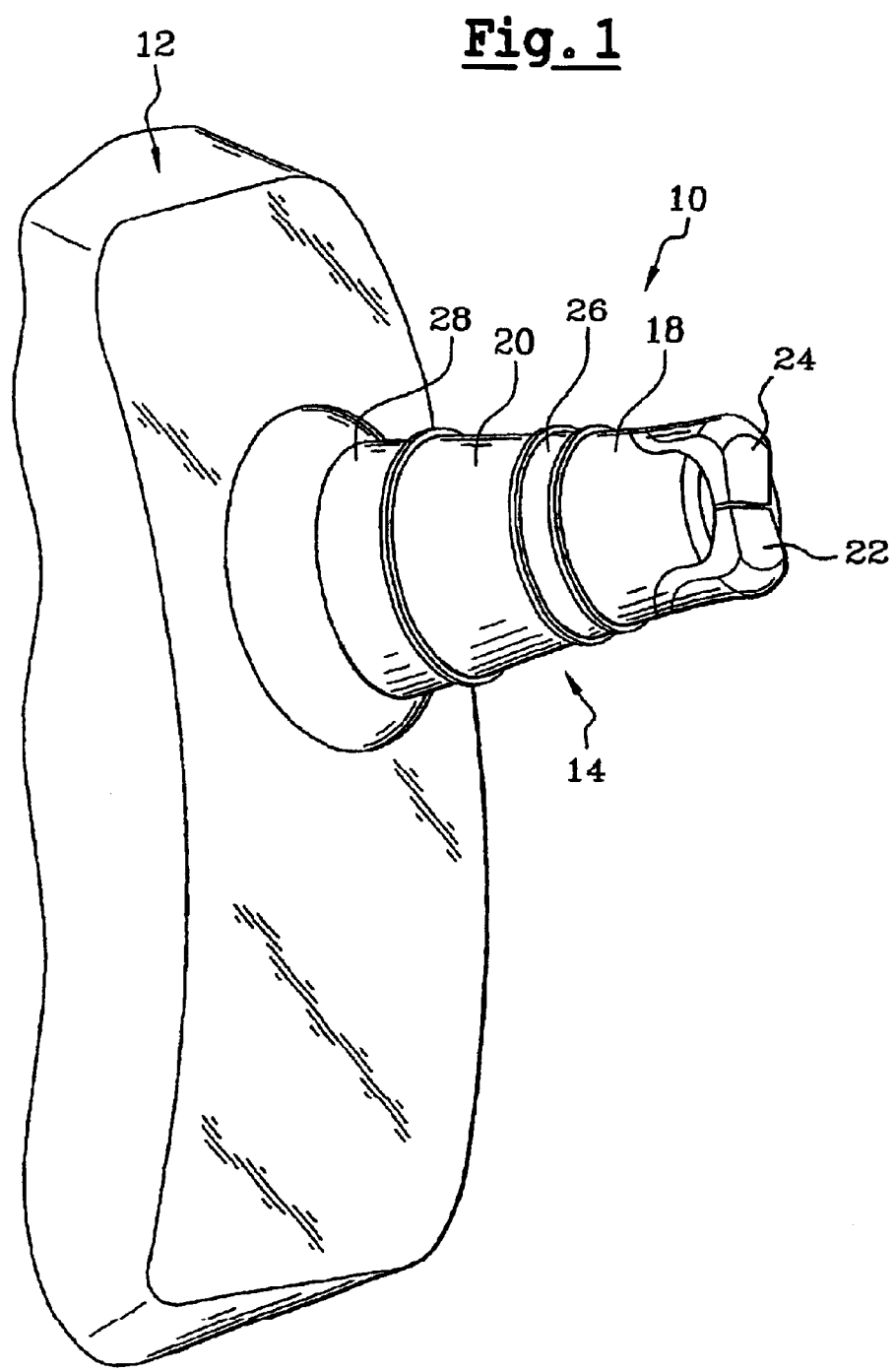
FIG. 1 is a perspective view of a control device for a motor vehicle, constituting a first embodiment of the invention.
Figure 2:
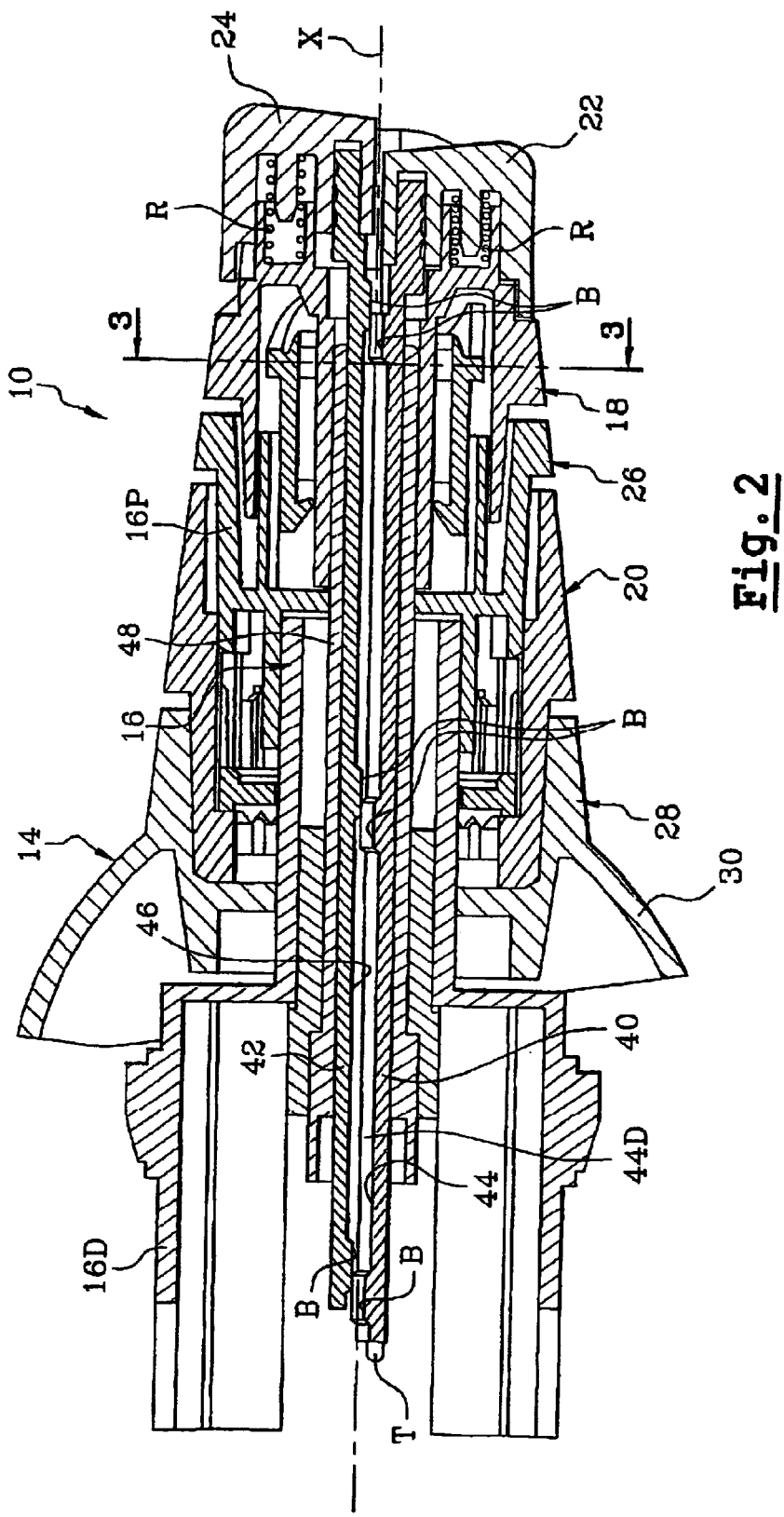
FIG. 2 is a longitudinal section view of the control device shown in FIG. 1.
Figure 4:
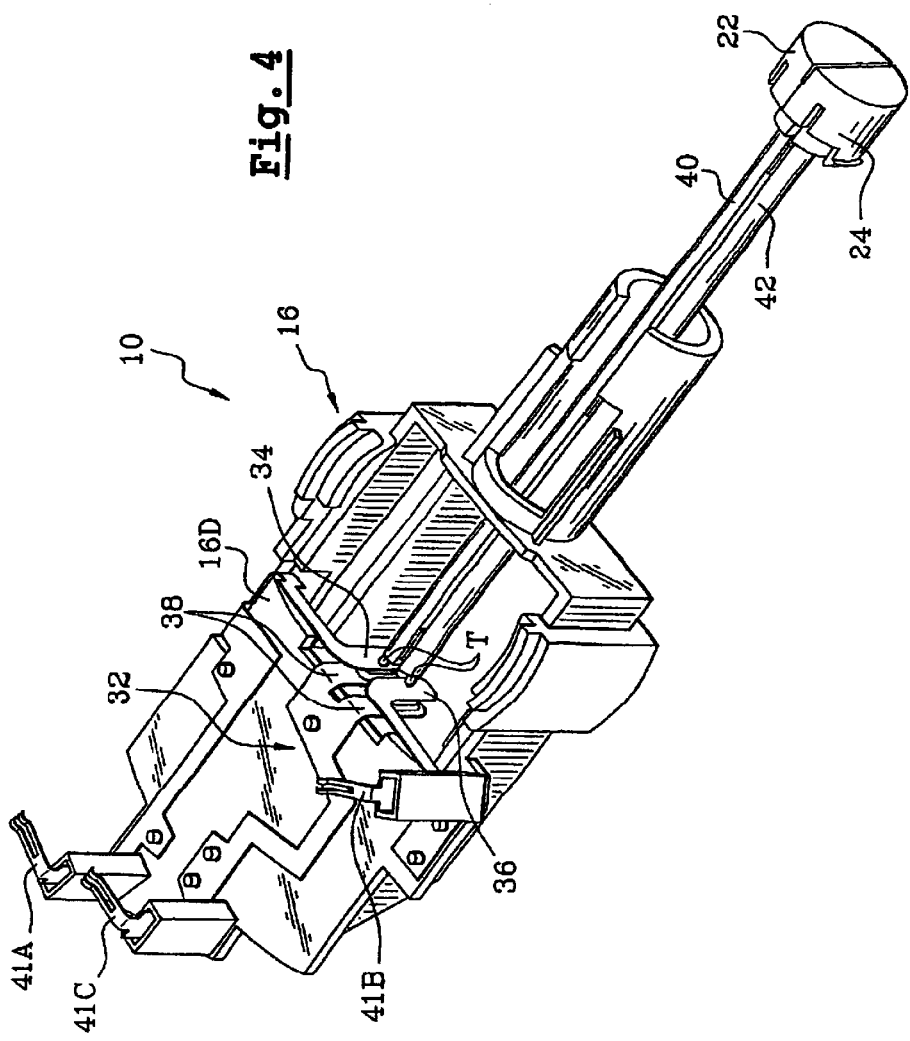
FIG. 4 is a perspective view showing certain members of the control device shown in FIG. 1.

With reference more particularly to FIGS. 2 and 4, it can be seen that the lever 14 comprises a support 16 of generally elongate shape comprising two portions engaged one in the other. The first portion shown in FIGS. 2 and 4 defines a distal end 16D of the support 16. The second portion shown in FIG. 2 defines a proximal end 16P of the support 16.

The support 16 carries a first control ring 18 mounted to turn in conventional manner on the proximal end 16P of the support about a geometrical axis referred to below as the longitudinal axis X. The support 16 also carries a second control ring 20 mounted to turn in conventional manner about the longitudinal axis X. This second control ring 20 is interposed axially between the first ring 18 and the distal end 16D of the support.

The control rings 18 and 20 form electrical switch means intended, for example, to control a motor and/or sequencing means for the windscreen wipers of the vehicle.

The first control ring 18 carries first and second control buttons 22 and 24 forming electrical switch means intended, for example, to control the scrolling of menus on a computer on board the vehicle. The first control button 22 is intended, for example, to scroll menus in a first direction while the second control button 24 is intended to cause the menus to scroll in a second direction opposite to the first.

The first and second control rings 18 and 20 are axially separated from each other by a first fixed ring 26 secured to the support 16. A second fixed ring 28 secured to the support 16 carries a skirt 30 that is generally in the form of a spherical cap. This second fixed ring 28 is interposed axially between the second control ring 20 and the distal end 16D of the support.

The distal end 16D of the support is articulated on the baseplate 12 (shown in FIG. 1) via conventional ball-and-socket means. Thus, the lever 14 can pivot up and down as well as backwards and forwards relative to the orientation shown in FIG. 1.

With reference to FIG. 4, it can be seen that the distal end 16D of the support carries means 32 forming an electrical contactor. These means 32 preferably comprise first and second flexible conductive tongues 34 and 36 that are elastically deformable and intended to be put at potentials of opposite polarity. The means 32 also include a pair of conductive tongues 38 against which the first and second deformable tongues 34 and 36 are designed to be put into contact in order to close first and second electrical circuits, respectively.

The conductive tongues 34 to 38 are connected to a conventional control circuit carried by the baseplate 12 by means of conductive tracks provided with wiper contacts 41A, 41B, and 41C. These contacts serve to maintain electrical connection between the contactor means 32 and the control circuit carried by the baseplate 12, regardless of the movements of the support 16 relative to the baseplate 12.

The support 16 carries first and second control rods 40 and 42 that are movable longitudinally through the rings 18 and 20. Each control rod 40, 42 has a proximal end connected to a respective control button 52, 54, and a distal end for actuating the electrical contactor means 32 that are designed to co-operate with a corresponding flexible tongue 34, 36.

Each control button 22, 24 is movable in translation together with the rod 40, 42 to which it is connected, substantially parallel to the axis X between a rest position towards which it is urged resiliently by a spring R (see button 24 shown in FIG. 2), and an active position (see button 22 shown in FIG. 2) in which the rod 40, 42 bears against the corresponding flexible tongues 34, 36 in order to put it into contact with the pair of tongues 38.

Thus, each flexible tongue 34, 36 can be displaced between a position in which the corresponding electrical circuit is open (rest position) and a position in which the electrical circuit is closed (active position) towards which position it is urged by the corresponding control rod 40, 42.

In the first embodiment of the invention, the springs R are of the helical type.

It should be observed that in order to optimize contact between the control rods 40, 42 and the flexible conductive tongues 34, 36, the distal ends of the rods 40, 42 carry respective studs T for co-operating with the corresponding flexible conductive tongue 34, 36.

Figure 3:
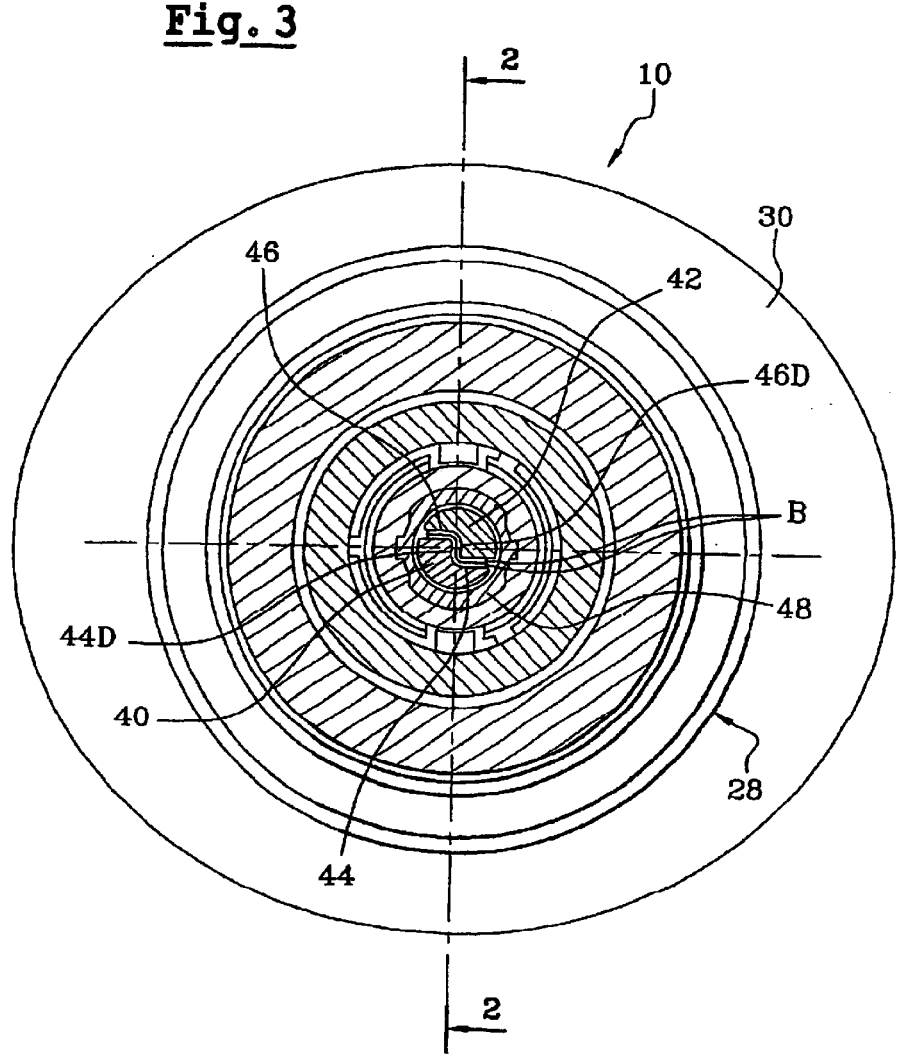
FIG. 3 is a section view on line 3—3 of FIG. 2.

With reference in particular to FIGS. 2 and 3, it can be seen that the control rods 40, 42 include mutual longitudinal guide means. In the example described, these longitudinal guide means comprise complementary mutual guide faces 44, 46 each provided with an offset 44D, 46D defining a step forming a longitudinal guide strip. In order to limit friction between the mutual guide faces 44, 46, they are provided with projections B matching their general step shape so as to define small areas of mutual contact. In the example described, the rods 40, 42 have three pairs of mutual contact projections B, these projections being distributed axially along the rods 40, 42.

It should be observed that each of the control rods 40, 42 presents a cross-section that is circular and interrupted by the complementary mutual guide faces 44, 46. Thus, the control rods 40 and 42 together form a generally cylindrical shape that is substantially coaxial about the longitudinal axis X, and capable of turning about said axis X together with the first control ring 18 and the buttons 22, 24.

The angular travel of the first control ring 18 in the example described is restricted to about 60°. The relative positioning of the distal ends of the control rods 40, 42 and of the flexible tongues 34, 36 is adapted to avoid preventing the rods 40, 42 co-operating with the tongues 34, 36 when the first control button 18 is turned.

The assembly comprising the two control rods 40, 42 is received in a tubular member 48 carried by the support 16 and forming a guide bearing. This tubular member 48 also participates in guiding each of the control rods 40, 42 longitudinally.

The operation of the lever 14 of the control device of the invention is very simple. In particular, the user actuates the control rings 18, 20 by turning them about the axis X so as to control the motor and/or the sequencing means of the windscreen wipers. In order to cause menus to scroll on the on-board computer, the user actuates one or other of the control buttons 22, 24 depending on the desired scrolling direction by pressing the button longitudinally against the return force of the spring R. This has the effect of actuating the contactor means 32 via the rod 40, 42 connected to the control button 22, 24 pressed by the user.

Figure 5:
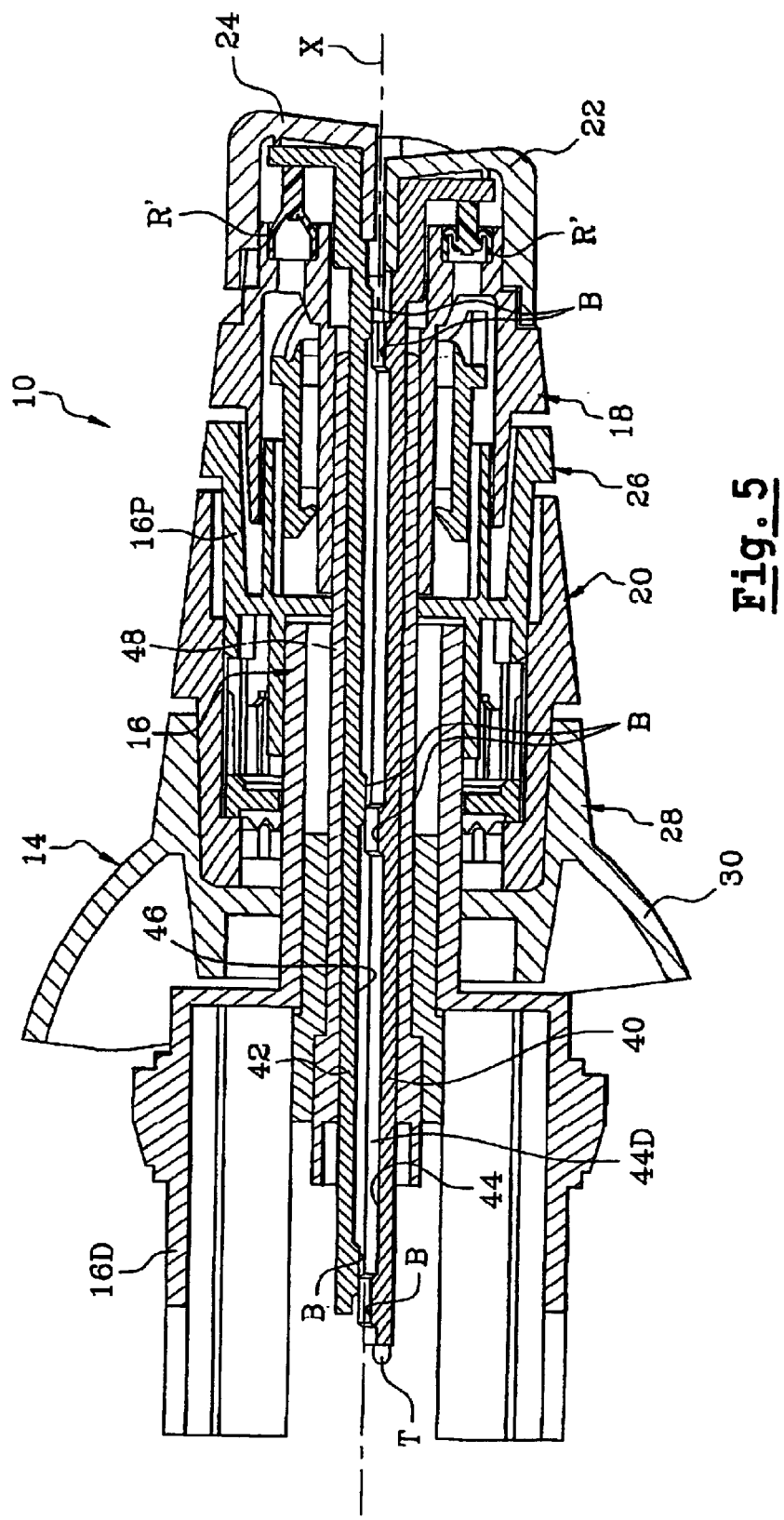
FIG. 5 is a view similar to FIG. 2 showing a control device constituting a second embodiment of the invention.

In the second embodiment of the invention shown in FIG. 5, the control buttons 22, 24 are urged resiliently towards their rest position by springs R' of the deformable blister type.

More particularly, the springs R' shown in FIG. 5 are generally blister-shaped and they are made of silicone.

Moving a button 22, 24 from its rest position towards its active position causes the corresponding return spring R' to be deformed by passing through a hard point. The user actuating a button 22, 24 perceives this hard point which also provides tactile feedback concerning actuation of the contactor means 32.

In a variant, the springs R' may be constituted by blades presenting a deformable blister effect, such blades being cheaper than the helical springs R or the silicone blister springs R'.

The advantages of the invention include that of enabling the electrical switching means carried by the control device to be increased so as to enable said device to be used to control an on-board computer having multiple menus, with this being done by using electrical contactor means 32 that are arranged in the distal end of the lever support 16, i.e. that are offset longitudinally towards the baseplate 12 relative to the control rings 18, 20 and the control buttons 22, 24.

What is claimed is:

1. Control device for a motor vehicle, the vehicle comprising a base plate in a cabin, the control device comprising:
   a) a support having a proximal end and a distal end, the proximal end comprising first and second control buttons, the distal end being articulated on a baseplate arranged on the motor vehicle and comprising electrical contactor means;
   b) at least a first control ring mounted to turn on the support about a longitudinal axis;
   c) at least first and second control rods that are longitudinally displaceable through the first control ring and including mutual longitudinal guide means, the first and second control rods each having a proximal end connected, respectively, to the first and second control buttons, the first and second control rods also each having a distal end for actuating the electrical contactor means.

2. Control device of claim 1, wherein the longitudinal guide means comprises complementary mutual guide faces each comprising an offset forming a longitudinal guide strip.

3. Control device of claim 2, wherein the complementary mutual guide faces include projections defining mutual contact areas.

4. Control device of claim 2, wherein the control rods have a circular cross-section interrupted by the complementary mutual guide faces.

5. Control device of claim 1, wherein the electrical contactor means comprises first and second flexible conductive blades each of which is elastically deformable between an open position of an electrical circuit and a closed position of the electrical circuit, each blade being urged toward the closed position by a corresponding control rod.

6. Control device of claim 5, wherein the distal end of at least one control rod includes a stud cooperating with the corresponding flexible blade.

7. Control device of claim 1, wherein the first control ring is mounted to turn on the proximal end of the support and carries the first and second control buttons, the first and second control rods forming an actuator assembly of generally cylindrical shape that is substantially coaxial about the longitudinal axis.

8. Control device of claim 7, wherein the support carries a second control ring mounted to turn about the longitudinal axis and the second control ring is interposed axially between the first control ring and the distal end of the support.

9. Control device of claim 1, wherein the control buttons control a computer on the motor vehicle.

10. Control device for a motor vehicle, the vehicle comprising a base plate in a cabin, the control device comprising:

a) a support having a proximal end and a distal end, the proximal end comprising first and second control buttons, the distal end being articulated on a baseplate arranged on the motor vehicle and comprising an electrical contactor means comprising first and second flexible conductive blades each of which is elastically deformable between an open position of an electrical circuit and a closed position of the electrical circuit, each blade being urged toward the closed position by a corresponding control rod;

b) at least a first control ring mounted to turn on the support about a longitudinal axis;

c) at least first and second control rods that are longitudinally displaceable through the first control ring and including mutual longitudinal guide means, the first and second control rods each having a proximal end connected, respectively, to the first and second control buttons, the first and second control rods also each having a distal end for actuating the electrical contactor.

* * * * *

UNITED STATES PATENT AND TRADEMARK OFFICE
CERTIFICATE OF CORRECTION

PATENT NO.    : 6,878,886 B1
DATED         : April 12, 2005
INVENTOR(S)   : Mange, Jean-Christophe and Chiattelli, Claudio It is certified that error appears in the above-identified patent and that said Letters Patent is hereby corrected as shown below:

<u>Title page,</u>
Item [73], Assignee, replace "Valco Electronique" with -- Valeo Electronique -- .

Signed and Sealed this

Ninth Day of August, 2005

JON W. DUDAS
*Director of the United States Patent and Trademark Office*